United States Patent
Iwasaki et al.

[11] Patent Number: 5,869,145
[45] Date of Patent: Feb. 9, 1999

[54] WET-GUNNING METHOD FOR DENSE CASTABLE REFRACTORY COMPOSITION

[75] Inventors: Itsutoshi Iwasaki; Toshihiko Takeshige, both of Fukuoka-ken, Japan

[73] Assignee: Taiko Refractories Co., Ltd., Fukuoka-ken, Japan

[21] Appl. No.: 938,562

[22] Filed: Sep. 26, 1997

[30] Foreign Application Priority Data

Oct. 15, 1996 [JP] Japan .................................. 8-293215

[51] Int. Cl.$^6$ ....................................................... B05D 1/02
[52] U.S. Cl. .......................................................... 427/427
[58] Field of Search ............................................. 427/427

[56] References Cited

U.S. PATENT DOCUMENTS

| | | | |
|---|---|---|---|
| 4,055,437 | 10/1977 | Petrak | 106/64 |
| 4,227,932 | 10/1980 | Leah et al. | 106/84 |
| 4,623,393 | 11/1986 | Toda et al. | 106/38.22 |
| 4,683,151 | 7/1987 | Hamaguchi et al. | 427/397.8 |
| 4,751,204 | 6/1988 | Kyoden et al. | 501/89 |
| 4,952,534 | 8/1990 | Davis et al. | 501/94 |
| 4,981,628 | 1/1991 | Willard | 264/30 |
| 5,284,808 | 2/1994 | Damiano et al. | 501/103 |

FOREIGN PATENT DOCUMENTS

| | | | |
|---|---|---|---|
| B577350 | 2/1982 | Japan | F27D 1/16 |
| A61-111973 | 10/1984 | Japan | C04B 35/66 |
| B6221753 | 5/1987 | Japan | C04B 35/66 |
| B563437 | 8/1989 | Japan | C04B 35/66 |
| B21795 | 1/1990 | Japan | C04B 35/66 |
| B227308 | 6/1990 | Japan | C04B 35/66 |
| B233665 | 7/1990 | Japan | C04B 35/66 |
| B521866 | 2/1991 | Japan | C04B 35/66 |
| B617273 | 3/1994 | Japan | C04B 35/66 |

*Primary Examiner*—Benjamin Utech
*Attorney, Agent, or Firm*—Sughrue, Mion, Zinn, Macpeak & Seas, PLLC

[57] ABSTRACT

The method for wet-gunning a castable refractory composition includes the steps of (a) preparing a cement-free, castable refractory composition comprising 70–98 weight % of refractory aggregate having a particle size of 10 mm or less, 2–30 weight % of ultrafine refractory powder having a particle size of 10 $\mu$m or less, and 0.01–1.0 weight % (outer percentage) of a dispersing agent, and further a thickener (in the case of factory premixing); (b) premixing the cement-free, castable refractory composition with water in situ or in a factory to provide an in-situ premixed or factory-premixed, water-containing refractory material having a castable fluidity; (c) conveying the in-situ premixed or factory-premixed, water-containing refractory material to a gunning nozzle by a pump; (d) adding 0.1–1 weight % (outer percentage) of an alkali silicate or an alkali aluminate as a shape retention agent in the form of an aqueous solution to the in-situ premixed or factory-premixed, water-containing refractory material together with compressed air in the gunning nozzle; and (e) gunning the resulting mixture through the gunning nozzle.

12 Claims, 1 Drawing Sheet

WET-GUNNING METHOD FOR DENSE CASTABLE REFRACTORY COMPOSITION

BACKGROUND OF THE INVENTION

The present invention relates to a method for wet-gunning a dense, castable refractory composition to construct linings of vessels for molten metals such as ladles, tundishes and troughs, etc.

Lately, castable refractories with easy installation have been more and more replaced for bricks as materials for linings of vessels for molten metals, as the castable refractories have been provided with improved durability. However, casting methods are still disadvantageous in terms of time and labor needed for placement of molds in casting. In these respects, gunning methods are advantageous in reduced time and labor requirements and in versatility of repair, because these methods do not require the formation of molds and can quickly make partial repair. Accordingly, the gunning methods have been finding more and more applications.

Most widely used is a dry-gunning method. However, refractory layers formed by the dry-gunning method are poor in durability and suffer from rebound loss, poor working environment due to dusts, etc. To overcome the problems of the dry-gunning methods, developments have thus been made recently to provide various gunning methods such as a semi-dry gunning method, a wet-gunning method, etc., and refractory materials therefor.

In the semi-dry gunning method, the gunning refractory material is premixed with part of necessary water by a mixer, pneumatically conveyed to a gunning nozzle of a dry-gunning machine, mixed with the remaining water, or with a solution or a suspension containing a hardening agent in the gunning nozzle (or before reaching the gunning nozzle), and then gunned through the nozzle. The semi-dry gunning methods are exemplified in Japanese Patent Laid-Open No. 61-111973, and Japanese Patent Publication Nos. 2-27308, 6-17273, 5-63437 and 5-21866, etc.

Japanese Patent Laid-Open No. 61-111973 discloses the combination of a hardening accelerator and sodium silicate (binder), and Japanese Patent Publication Nos. 2-27308, 6-17273 disclose low-cement castables. Also, both of Japanese Patent Publication Nos. 5-63437 and 5-21866, owned by the same applicant, disclose castable refractory materials containing ultrafine powder and dispersing agents, which are not hardened at room temperature. Specifically, in the former reference a refractory clay is used as indispensable ultrafine powder and solidified by $Ca(OH)_2$, sodium silicate or sodium aluminate introduced at a nozzle to improve the resistance to dry-explosive spalling. In the latter reference, a refractory composition to which a moisture retention agent is added is premixed with water in an amount of ⅕–¾ of the normally required amount in a factory to provide a wet refractory material, which is then solidified by sodium silicate, sodium aluminate or colloidal silica introduced at a nozzle.

Though improvements were achieved to some extent in these semi-dry gunning methods in reducing dust generation and rebound loss, these semi-dry gunning methods still provide the formed refractory layers with poor adhesion, homogeneity and density, since the refractory materials should be mixed with water in a gunning nozzle very quickly, resulting in poor mixing at an unstable water ratio.

The wet-gunning methods typically include the following two methods:

(1) Gunning refractories supplied in a dry state are premixed with all of water required for gunning by a mixer at a construction site, conveyed to a nozzle and then gunned. This method may be called "an in-situ premixing, gunning method."

(2) Gunning refractories premixed with all of water required for gunning in a factory are supplied to a nozzle and gunned therethrough. The gunning refractories may be called "factory-premixed water-containing refractory materials," and this gunning method may be called "a factory-premixing, gunning method."

In the wet-gunning methods, it is possible to add a small amount of an aqueous solution of a hardening agent or a hardening-adjusting agent to the gunning refractories in a nozzle. The wet-gunning methods are classified into a gunning machine method and a pumping method depending on conveying means of gunning materials. In the case of the pumping method, compressed air is introduced into the gunning nozzle to spray gunning materials. The present invention belongs to the latter category. Depending on the amount of water added, there are provided gunning materials with various workabilities ranging from a plastic level to a slurry level.

These wet-gunning methods are exemplified in Japanese Patent Publication Nos. 57-7350, 62-21753, 2-33665, 2-1795, etc. Because the gunning materials disclosed in Japanese Patent Publication No. 57-7350 are in the form of a slurry having a water content of 10–20%, they are not expected to be formed into dense refractory layers suitable for linings of vessels for molten metals. In the latter three methods, the gunning refractory materials are supplied in the form of a moist premix containing water or an aqueous solution, making it possible for them to be produced and stored in factories. These wet-gunning methods contribute to the reduction of labor and the improvement of working environment because blending is not needed at the gunning site.

However, these conventional methods do not utilize the dispersion action of ultrafine refractory powder to reduce the amount of water added to the castable refractory compositions. Also, because particles contained in the gunning materials have maximum particle sizes of 4 mm or less, they are still not different from gunning technologies of the previous generation. Accordingly, the gunned refractory layers are insufficient in denseness and thus poor in durability, as compared with those produced by casting methods of dense, castable refractory materials.

OBJECT AND SUMMARY OF THE INVENTION

Accordingly, an object of the present invention is to provide a method for gunning a low-moisture castable refractory composition to provide a gunned refractory layer having high density, strength and corrosion resistance.

Thus, the first wet-gunning method according to the present invention comprising the steps of:

(a) preparing a cement-free, castable refractory composition comprising 70–98 weight % of refractory aggregate having a particle size of 10 mm or less, 2–30 weight % of ultrafine refractory powder having a particle size of 10 μm or less, and 0.01–1.0 weight % (outer percentage), based on 100 weight % of the refractory aggregate+the ultrafine refractory powder, of a dispersing agent;

(b) premixing the cement-free, castable refractory composition with water or other blending liquids in situ to provide an in-situ premixed, water-containing refractory material having a castable fluidity;

(c) conveying the in-situ premixed, water-containing refractory material to a gunning nozzle by a pump;

(d) adding an alkali silicate or an alkali aluminate as a shape retention agent in the form of an aqueous solution to the in-situ premixed, water-containing refractory material, in an amount of 0.1–1 weight % (outer percentage) based on 100 weight % of the refractory aggregate+the ultrafine refractory powder, together with compressed air in the gunning nozzle; and (e) gunning the resulting mixture through the gunning nozzle.

The second wet-gunning method according to the present invention comprising the steps of:

(a) preparing a cement-free, castable refractory composition comprising 70–98 weight % of refractory aggregate having a particle size of 10 mm or less, 2–30 weight % of ultrafine refractory powder having a particle size of 10 μm or less, 0.01–1.0 weight % (outer percentage), based on 100 weight % of the refractory aggregate+the ultrafine refractory powder, of a dispersing agent, and a thickener;

(b) premixing the cement-free, castable refractory composition with water or other blending liquids in a factory to provide a factory-premixed, water-containing refractory material having a castable fluidity;

(c) conveying the factory-premixed, water-containing refractory material to a gunning nozzle by a pump;

(d) adding an alkali silicate or an alkali aluminate as a shape retention agent in the form of an aqueous solution to the factory-premixed, water-containing refractory material, in an amount of 0.1–1 weight % (outer percentage) based on 100 weight % of the refractory aggregate+the ultrafine refractory powder, together with compressed air in the gunning nozzle; and (e) gunning the resulting mixture through the gunning nozzle.

DETAILED DESCRIPTION OF THE INVENTION

[1] Cement-free, castable refractory composition

Figure 1:
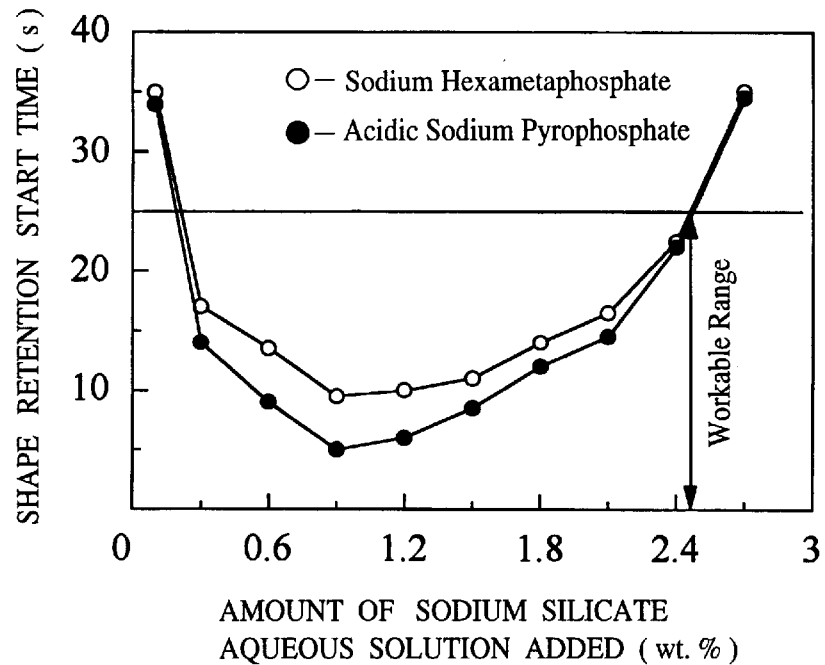
FIG. 1(a) is a graph showing the relation between the amount of a sodium silicate aqueous solution added and the shape retention start time in case where sodium hexametaphosphate and acidic sodium pyrophosphate were used as dispersing agents.
FIG. 1(b) is a graph showing the relation between the amount of a sodium aluminate aqueous solution added and the shape retention start time in case where sodium hexametaphosphate and polyacrylic acid were used as dispersing agents.
Figure 1:
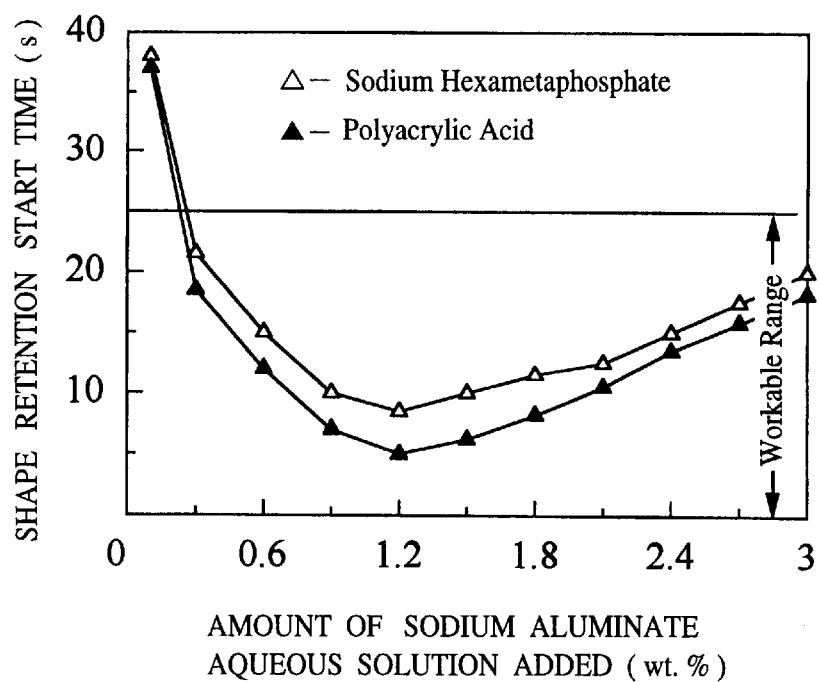

The cement-free, castable refractory composition of the present invention comprises (A) refractory aggregate, (B) ultrafine refractory powder, and (C) a dispersing agent.

(A) Refractory aggregate

The refractory aggregate used for the present invention may be electrofused alumina, sintered alumina, bauxite, kyanite, andalusite, mullite, chamotte, pyrophyllite, silica, alumina-magnesia spinel, magnesia, zircon, zirconia, silicon carbide, graphite, pitch, etc., and two or more of them may be combined if necessary. The particle size of the refractory aggregate is 10 mm or less. When the particle size of the refractory aggregate is more than 10 mm, pumping efficiency is lowered with increased rebound loss. The amount of the refractory aggregate is 70–98 weight % based on 100 weight % of the refractory aggregate+the ultrafine refractory powder. The preferred amount of the refractory aggregate is 75–95 weight %.

(B) Ultrafine refractory powder

The ultrafine refractory powder used for the present invention may be ultrafine powder of alumina, amorphous silica, silica, titania, mullite, zirconia, chromia, silicon carbide, carbon, etc., and two or more of them may be combined if necessary. Ultrafine refractory clay powder is not preferable because it provides the resulting refractory layers with deteriorated resistance to dry-explosive spalling and poor strength.

The particle size of the ultrafine refractory powder is 10 μm or less, preferably 1 μm or less. When the particle size of the ultrafine refractory powder is more than 10 μm, water-reducing effect is lowered in combination with the dispersing agent. When the particle size of the ultrafine refractory powder is 1 μm or less, the water-reducing effect is remarkable.

The amount of the ultrafine refractory powder is 2–30 weight % based on 100 weight % of the refractory aggregate+the ultrafine refractory powder. When the amount of the ultrafine refractory powder is less than 2 weight %, water-reducing effect is lowered. When the amount of the ultrafine refractory powder is more than 30 weight %, an increased amount of water is needed for gunning, and the resultant refractory layers suffer from a large shrinkage after burning. The preferred amount of the ultrafine refractory powder is 5–25 weight %.

(C) Dispersing agent

The dispersing agents used for the present invention may be (1) alkali metal salts of condensed phosphoric acids such as sodium ultra-polyphosphate, acidic sodium hexametaphosphate, sodium hexametaphosphate, acidic sodium pyrophosphate, etc.; (2) organic acids such as polyacrylic acid, citric acid, humic acid, etc. or alkali metal salts thereof; or (3) organic sulfonic acids such as lignin sulfonic acid, alkyl sulfonic acid, aromatic sulfonic acid, etc. or alkali metal salts thereof. Two or more of these dispersing agents may be combined if necessary. Particularly effective among them are sodium ultra-polyphosphate, acidic sodium hexametaphosphate, acidic sodium pyrophosphate, polyacrylic acid and citric acid, which indicate a pH of 5 or less in a 1% aqueous solution. This is because these acidic dispersing agents exhibit not only dispersing action but also shape retention effects by accelerating the gelation of the shape retention agent, alkali silicate and alkali aluminate. It is of course possible to use both neutral or alkaline dispersing agents and acidic substances such as boric acid, phosphoric acid, etc. in place of the acidic dispersing agents. In hot gunning carried out on a still hot substrate, hardening is preferably accelerated to some extent to achieve good adhesion, and the acidic dispersing agents exhibit more effects in such gunning.

The amount of the dispersing agent is 0.01–1 weight % (outer percentage) based on 100 weight % of the refractory aggregate+the ultrafine refractory powder. When the amount of the dispersing agent is less than 0.01 weight %, sufficient dispersion effects are not obtained. When it is more than 1 weight %, optimum dispersion is not achieved. The preferred amount of the dispersing agent is 0.03–0.8 weight %.

(D) Thickener

In the case of the factory-premixed, water-containing refractory material, a thickener and water or other blending liquids are added in a factory. The thickener functions to prevent the segregation of ingredient particles and the separation of a liquid phase in the course of transportation of the factory-premixed, water-containing refractory material to a gunning site. In addition, it is expected to function as a co-binder. The thickeners used in the present invention are not restricted as long as they are usable as food additives, civil engineering or construction additives, etc. Particularly preferable among others are organic cellulose compounds and/or an isobutylene-maleic anhydride copolymers.

The amount of the thickener added is preferably 0.01–1 weight % (outer percentage) based on 100 weight % of the refractory aggregate+the ultrafine refractory powder. When the amount of the thickener is less than 0.01 weight %, thickening effects are too small to prevent the separation of ingredients. On the other hand, when it is more than 1 weight %, such problems as decrease in gunning characteristics (fluidity) and in resistance to dry-explosive spalling take place. The preferred amount of the thickener is 0.01–0.8 weight %.

(E) Other components

The above castable refractory composition, either factory-premixed or not, may further contain organic, inorganic or metal fibers, agents for preventing dry-explosive spalling such as metallic Al, oxycarboxylates, etc. Metallic substances such as metal fibers, metallic Al, etc. cannot be used for the factory-premixed, water-containing refractory material, because the metallic substances may react with water or other blending liquids during storing.

[2] Gunning method

The cement-free, castable refractory composition having the above composition is premixed with water or other blending liquids in situ to provide an in-situ premixed, water-containing refractory material having a castable fluidity. Also, the cement-free, castable refractory composition may be added the thickener and then premixed with water or other blending liquids in a factory to provide a factory-premixed, water-containing refractory material having a castable fluidity.

Though the amount of premixed water or other blending liquids may depend largely on the particle size distribution of the refractory composition and the porosity of the refractory aggregate, it is generally 5–8 weight % (outer percentage) based on 100 weight % of the refractory aggregate+the ultrafine refractory powder. When the amount of premixed water or other blending liquids is less than 5 weight %, fluidity is insufficient. On the other hand, when the amount of premixed water or other blending liquids is more than 8 weight %, peeling of the gunned refractory composition may take place.

The in-situ premixed or factory-premixed, water-containing refractory material is conveyed to a gunning nozzle by a pump and gunned through the nozzle while adding an aqueous solution of a shape retention agent together with compressed air. The aqueous solution of a shape retention agent is preferably supplied by a fixed displacement pump operable synchronously with a pump for conveying the in-situ premixed or factory-premixed, water-containing refractory material.

(F) Shape retention agent

The shape retention agent functions to diminish the fluidity of the in-situ premixed or factory-premixed, water-containing refractory material immediately after the gunning. Usable as the shape retention agent are an alkali silicate or an alkali aluminate in the form of an aqueous solution.

With respect to the alkali silicate, a molar ratio of $SiO_2/R_2O$, wherein $R_2O$ is an alkali metal oxide, is preferably 2.0–3.3. Widely commercially available as the alkali silicate aqueous solution are aqueous solutions of sodium silicate and potassium silicate. particularly, the sodium silicate aqueous solution is classified by JIS, and those identified as JIS 1, JIS 2, JIS 3, etc. may conveniently be used with or without dilution.

With respect to the alkali aluminate, a molar ratio of $R_2O/Al_2O_3$, wherein $R_2O$ is an alkali metal oxide, is preferably 1–3. Among them, sodium aluminate having an $Na_2O/Al_2O_3$ molar ratio of about 1–3 is commercially available in the form of an aqueous solution or powder. Though potassium aluminate is so expensive that it is not widely used in Japan, it may of course by used.

Both of alkali silicate and alkali aluminate rather exhibit a dispersing action when their amounts are too small, while they impart fluidity when their amounts are too large. This tendency is remarkable particularly in the case of alkali silicate. Accordingly, they exhibit a shape retention action only within a proper range of amount, though a shape retention mechanism is not clearly known.

The amount of the alkali silicate or the alkali aluminate is 0.1–1 weight % (outer percentage) based on 100 weight % of the refractory aggregate+the ultrafine refractory powder. When the amount of the alkali silicate or the alkali aluminate is less than 0.1 weight %, a sufficient shape retention action cannot be exhibited. On the other hand, when the amount of the alkali silicate or the alkali aluminate is more than 1 weight %, the percentage of alkali components is too high, resulting in decrease in corrosion resistance. The preferred amount of the alkali silicate or the alkali aluminate is 0.2–0.8 weight %.

The concentration of an aqueous solution of the shape retention agent is properly 25–50 weight %. The amount of the shape retention agent as an aqueous solution may depend on the concentration of the aqueous solution. Because too much water content would generally reduce the denseness of the cast refractory composition, the amount of the aqueous solution of the shape retention agent is preferably 2 weight % or less.

The present invention will be explained more specifically by Examples and Comparative Examples below without intention of restricting the scope of the present invention defined in the claims attached hereto.

EXAMPLES 1

The refractory composition having a formulation shown in Table 1 was mixed with various types of dispersing agents to examine the relation between the amount of a shape retention agent aqueous solution added and the shape retention start time, which corresponds to a time period taken until the mixture loses its fluidity. The shape retention agent aqueous solutions used are an aqueous solution of sodium silicate (JIS 1, concentration: 44 weight %) and an aqueous solution of sodium aluminate ($Na_2O/Al_2O_3$ molar ratio: 1.7, concentration: 38 weight %). Selected as dispersing agents are sodium hexametaphosphate, acidic sodium pyrophosphate and polyacrylic acid, and their amounts are 0.1 weight % each.

TABLE 1

| Formulation (weight %) | |
|---|---|
| Refractory Aggregate | |
| Silicon Carbide (6–3 mm)[1] | 18 |
| Silicon Carbide (3–1 mm)[2] | 20 |
| Silicon Carbide (≦1 mm)[3] | 17 |
| Silicon Carbide (≦150 μm)[4] | 25 |

TABLE 1-continued

| Formulation (weight %) | |
|---|---|
| Ultrafine Refractory Powder | |
| Ultrafine Alumina Powder[5] | 15 |
| Amorphous Silica[6] | 3.5 |
| Carbon Black[7] | 1.5 |
| Amount of Premixed Water[8] | 7.0 |

Note:
[1] Particle size range: more than 3 mm and 6 mm or less.
[2] Particle size range: more than 1 mm and 3 mm or less.
[3] Particle size range: 1 mm or less.
[4] Particle size range: 150 $\mu$m or less.
[5] Particle size: 10 $\mu$m or less.
[6] Particle size: 1 $\mu$m or less.
[7] Particle size: 1 $\mu$m or less.
[8] Outer percentage.

The measurement of the shape retention start time was carried out as follows: First, each castable refractory composition was prepared by adding a dispersing agent to the formulation shown in Table 1 and blending it with 7 weight % (outer percentage) of water, and about 300 g of the resultant castable refractory composition was introduced into a container. It was then mixed with a predetermined amount of a shape retention agent and stirred to measure the shape retention start time. Here, the shape retention start time is defined as a mixing time until the resultant mixture does not flow from a container when the container is turned over laterally. The measurement results are shown in FIGS. 1(a) and (b). Incidentally, with respect to the relation between the shape retention start time and the feasibility of the actual wet-gunning, it is empirically known that the wet-gunning can be carried out when the shape retention start time is up to about 25 seconds.

As is clear from FIGS. 1(a) and (b), shape retention is insufficient when the amount of the shape retention agent aqueous solution added is as small as about 0.1 weight %, while the shape retention start time gradually decreases (namely, shape retention is accelerated), as the amount of the shape retention agent aqueous solution added increases. The shape retention start time reaches a minimum level in a certain range, and it rebounds to increase after passing that range. In the case of an aqueous solution of sodium silicate, however, when the amount of the shape retention agent aqueous solution added becomes about 2.4 weight % or more, the wet-gunning becomes impossible due to excess fluidity.

with respect to the dispersing agent, a shorter shape retention start time and thus a larger shape retention action can be achieved by an acidic dispersing agent such as acidic sodium pyrophosphate (pH=about 4.2 for 1% aqueous solution) and polyacrylic acid (pH=about 2.5 for 1% aqueous solution) than by sodium hexametaphosphate whose pH is near neutral.

EXAMPLES 2–5, COMPARATIVE EXAMPLES 1–3

1. Formulation

The formulations of the in-situ premixed, water-containing refractory materials and the factory-premixed, water-containing refractory material used are shown in Table 2. Examples 2–4 and Comparative Examples 1–2 used SiC/Al$_2$O$_3$—based castable refractory compositions, and Example 4 used a factory-premixed, water-containing refractory material. Also, Example 5 and Comparative Example 3 used Al$_2$O$_3$/MgO—based castable refractory compositions.

2. Wet-gunning

Each of the castable refractory compositions blended with a premixing amount of water in situ (Examples 2, 3 and 5) or in a factory (Example 4) was conveyed by a pump to a gunning nozzle, where it was mixed with a shape retention agent aqueous solution in an amount (outer percentage) shown in Table 2 to carry out the wet-gunning.

In Comparative Example 1, the castable refractory composition blended with a premixing amount of water was cast into a mold. Since the refractory composition does not harden at room temperature, it was aged and dried while heating in the mold. Incidentally, since the castable refractory composition of Comparative Example 1 exhibited extreme sagging, the wet-gunning could not be carried out without adding the shape retention agent.

In Comparative Examples 2 and 3, the castable refractory compositions having formulations shown in Table 2 and premixed with a small amount of water were pneumatically conveyed to a gunning nozzle to conduct the semi-dry gunning. Incidentally, an aqueous solution of sodium aluminate was added at a nozzle in Comparative Example 2, while no shape retention agent was added in Comparative Example 3.

Each of the refractory products formed according to the methods of Examples 2–5 and Comparative Examples 1–3 was cut and dried to form test pieces. The total amount of water used for the gunning is also shown in Table 2 together with the methods of forming the refractory products.

TABLE 2

| Percentages of Components | Example | | | |
|---|---|---|---|---|
| (weight %) and Method | 2 | 3 | 4 | 5 |
| Refractory Aggregate | | | | |
| Silicon Carbide (6–3 mm)[1] | 18 | 18 | 18 | — |
| Silicon Carbide (3–1 mm)[2] | 20 | 20 | 20 | — |
| Silicon Carbide ($\leq$1 mm)[3] | 17 | 17 | 17 | — |
| Silicon Carbide ($\leq$150 $\mu$m)[4] | 25 | 25 | 25 | — |
| Electrofused Alumina (5–1 mm)[5] | — | — | — | 45 |
| Electrofused Alumina (3–1 mm)[6] | — | — | — | — |
| Electrofused Alumina ($\leq$1 mm)[7] | — | — | — | 28 |
| Magnesia Clinker[8] | — | — | — | 7 |
| Ultrafine Refractory Powder | | | | |
| Ultrafine Al$_2$O$_3$ Powder ($\leq$10 $\mu$m)[9] | 15 | 15 | 15 | 19 |
| Amorphous Silica ($\leq$1 $\mu$m)[10] | 3.5 | 3.5 | 3.5 | 1 |
| Carbon Black ($\leq$1 $\mu$m)[11] | 1.5 | 1.5 | 1.5 | — |
| Clay | — | — | — | — |
| Cement Component | | | | |
| Alumina Cement[12] | — | — | — | — |
| Dispersing Agent | | | | |
| Sodium Hexametaphosphate[13] | 0.03 | 0.03 | 0.03 | 0.1 |
| Polyacrylic Acid[13] | 0.05 | 0.05 | 0.05 | — |
| Thickener | | | | |
| CMC[14] | — | — | 0.02 | — |
| IB-MA Copolymer[15] | — | — | 0.02 | — |
| Shape Retention Agent | | | | |
| Sodium Silicate Aqueous Solution[16] | 0.7 | — | 0.7 | — |
| Sodium Aluminate Aqueous Solution[17] | — | 0.8 | — | 0.6 |
| Agent for Preventing Dry-Explosive Spalling[18] | | | | |
| Organic Fibers | — | — | — | 0.05 |
| Oxycarboxylate | 0.6 | 0.6 | 0.6 | — |
| Amount of Premixed Water[18] | 7.0 | 7.0 | 7.8 | 5.5 |
| Total Water in Gunned Layer[18] | 7.5 | 7.5 | 8.3 | 5.9 |
| Formation Method | — | — | PM[19] | — |

Note:

TABLE 2-continued (1)Particle size range: more than 3 mm and 6 mm or less.
(2)Particle size range: more than 1 mm and 3 mm or less.
(3)Particle size range: 1 mm or less.
(4)Particle size range: 150 μm or less.
(5)Particle size range: more than 1 mm and 5 mm or less.
(6)Particle size range: more than 1 mm and 3 mm or less.
(7)Particle size range: 1 mm or less.
(8)Particle size range: 1 mm or less.
(9)Particle size: 10 μm or less.
(10)Particle size: 1 μm or less.
(11)Particle size: 1 μm or less.
(12)JIS Class 1, outer percentage.
(13)Outer percentage.
(14)Carboxymethyl cellulose, outer percentage.
(15)Isobutylene-maleic anhydride copolymer, outer percentage.
(16)Concentration = 30 weight %, $SiO_2/Na_2O$ molar ratio = 2.2, outer percentage.
(17)Concentration = 38 weight %, $Na_2O/Al_2O_3$ molar ratio = 1.7, outer percentage.
(18)Outer percentage.
(19)Premixed type.

| Percentages of Components | Comparative Example | | |
|---|---|---|---|
| (weight %) and Method | 1 | 2 | 3 |
| Refractory Aggregate | | | |
| Silicon Carbide (6–3 mm)(1) | 18 | — | — |
| Silicon Carbide (3–1 mm)(2) | 20 | 38 | — |
| Silicon Carbide (≤1 mm)(3) | 17 | 17 | — |
| Silicon Carbide (≤150 μm)(4) | 25 | 25 | — |
| Electrofused Alumina (5–1 mm)(5) | — | — | — |
| Electrofused Alumina (3–1 mm)(6) | — | — | 45 |
| Electrofused Alumina (≤1 mm)(7) | — | — | 28 |
| Magnesia Clinker(8) | — | — | 7 |
| Ultrafine Refractory Powder | | | |
| Ultrafine $Al_2O_3$ Powder (≤10 μm)(9) | 15 | 12 | 12 |
| Amorphous Silica (≤1 μm)(10) | 3.5 | 3.5 | 1 |
| Carbon Black (≤1 μm)(11) | 1.5 | 1.5 | — |
| Clay | — | 3 | 2 |
| Cement Component | | | |
| Alumina Cement(12) | — | — | 5 |
| Dispersing Agent | | | |
| Sodium Hexametaphosphate(13) | 0.03 | 0.03 | — |
| Polyacrylic Acid(13) | 0.05 | 0.05 | — |
| Thickener | | | |
| CMC(14) | — | — | 0.03 |
| IB-MA Copolymer(15) | — | — | — |
| Shape Retention Agent | | | |
| Sodium Silicate Aqueous Solution(16) | — | — | — |
| Sodium Aluminate Aqueous Solution(17) | — | 9.5 | — |
| Agent for Preventing Dry-Explosive Spalling(18) | | | |
| Organic Fibers | — | — | 0.05 |
| Oxycarboxylate | 0.6 | 0.6 | — |
| Amount of Premixed Water(18) | 7.0 | 3.0 | 3.0 |
| Total Water in Gunned Layer(18) | 7.0 | 9.7 | 11.8 |
| Formation Method | CA(20) | SD(21) | SD(21) |

Note:
(1)–(16), (18)The same as above.
(17)Concentration = 30 weight %, $Na_2O/Al_2O_3$ molar ratio = 1.7, outer percentage.
(20)Casting method.
(21)Semi-dry gunning method.

3. Evaluation
(1) Evaluation of test pieces

With respect to test pieces burned at 1,000° C. for 3 hours and 1,450° C. for 3 hours, respectively, a bulk specific gravity and a bending strength were measured. An apparent porosity of each test piece after burning at 1,450° C. for 3 hours was also measured. Further, a rotation erosion test was carried out to determine an index of erosion for each test piece. The methods for measuring the bending strength and the rotation erosion are given below. The measurement conditions and results are shown in Table 3.

(i) Bending strength (kgf/cm$^2$)
Each test piece was measured according to JIS R2553.

(ii) Index of erosion
In Group A (Examples 2–4 and Comparative Examples 1–2), a rotation erosion test was carried out at 1,500° C. for 5 hours using blast furnace slag as an erosive material. In Group B (Example 5 and Comparative Example 3), the rotation erosion test was carried out at 1,650° C. for 5 hours using converter slag ($CaO/SiO_2$ molar ratio: 4.2) as an erosive material.

The eroded test pieces were collected to measure an erosion depth per hour. The erosion depth per hour is expressed as an index of erosion (relative value), assuming that the value of Example 2 in Group A is 100, and that the value of Example 5 in Group B is 100. The larger the index of erosion, the more the test pieces are eroded.

TABLE 3

| | Example | | | |
|---|---|---|---|---|
| | 2 | 3 | 4 | 5 |
| Gunning Characteristics | Good No sagging | Good No sagging | Good No sagging | Good No sagging |
| Bulk Specific Gravity | | | | |
| at 1,000° C. | 2.38 | 2.39 | 2.37 | 3.02 |
| at 1,450° C. | 2.43 | 2.43 | 2.41 | 3.01 |
| Bending Strength after Burning (kgf/cm$^2$) | | | | |
| at 1,000° C. | 55 | 57 | 51 | 66 |
| at 1,450° C. | 116 | 120 | 105 | 148 |
| Apparent Porosity (%) | | | | |
| at 1,450° C. | 19.6 | 19.5 | 19.9 | 17.2 |
| Index of Erosion | 100 | 99 | 102 | 100 |

| | Comparative Example | | |
|---|---|---|---|
| | 1 | 2 | 3 |
| Gunning Characteristics | Could not be gunned by sagging | Much rebound loss and dust | Much rebound loss and dust |
| Bulk Specific Gravity | | | |
| at 1,000° C. | 2.41 | 2.13 | 2.40 |
| at 1,450° C. | 2.46 | 2.15 | 2.38 |
| Bending Strength after Burning (kgf/cm$^2$) | | | |
| at 1,000° C. | 60 | 41 | 35 |
| at 1,450° C. | 128 | 87 | 49 |
| Apparent Porosity (%) | | | |
| at 1,450° C. | 19.1 | 22.3 | 26.4 |
| Index of Erosion | 92 | 147 | 298 |

As is clear from Table 3, the in-situ premixed, water-containing refractory materials in Examples 2, 3 and 5 and the factory-premixed, water-containing refractory material in Example 4 were well gunned to form refractory products without sagging, while the semi-dry, castable refractory compositions of Comparative Examples 2 and 3 suffered from much dust and rebound loss.

With respect to the quality of the gunned refractory products, the bulk specific gravity and the apparent porosity have a close relation to the denseness of the gunned refractory products. The bulk specific gravity of the wet-gunned refractory products of Examples 2–5 are much higher than those of the semidry-gunned refractory products of Comparative Examples 2 and 3, though they are slightly lower than those of the cast refractory product of Comparative Example 1. Similarly, the index of erosion determined by the rotation erosion test has a close relation to the denseness of the gunned refractory products. The wet-gunned refractory products of Examples 2–4 show corrosion resistance comparable to that of Comparative Example 1, while that of Comparative Example 2 is considerably poor, and that of Comparative Example 3 is extremely lower than that of Example 5.

As described in detail above, according to the present invention, gunned refractory products having quality and corrosion resistance which are much better than the conventional gunned refractory products and comparable to those of the cast refractory products can be obtained by premixing a cement-free, castable refractory composition containing 10 $\mu$m or less of ultrafine refractory powder and a dispersing agent with water or other blending liquids in amounts sufficient in situ or in a factory to have a castable fluidity; supplying the in-situ premixed or factory-premixed, water-containing refractory material to a gunning nozzle by a pump; adding a small amount of a shape retention agent aqueous solution thereto together with compressed air in the nozzle; and then gunning the resultant mixture.

Since the castable refractory composition of the present invention is not hardened without adding a shape retention agent and need not be hardened, it is free from troublesome problems that working time and hardening time should be controlled as in the case of cold-setting materials such as low-cement castables, etc. Accordingly, the in-situ premixed or factory-premixed, water-containing refractory material does not harden in the course of transportation to a nozzle by a pump, avoiding such problems as to clog hoses or pipes.

Further, the present invention has the following advantages:

(1) Manual labor can drastically be slashed because troublesome labor of constructing molds as in the casting methods is not needed.

(2) The in-situ premixed, water-containing refractory material and the factory-premixed, water-containing refractory material can stably be supplied to a nozzle because of pumping, making it possible that an aqueous solution of a shape retention agent is added in a constant amount without necessitating strict control. Namely, the control of water supply can be carried out without being affected by the skill and experience of nozzlemen, unlike in the case of conventional semidry or dry gunning.

(3) Because the in-situ premixed, water-containing refractory material and the factory-premixed, water-containing refractory material are supplied in a completely flowable state, dust is not generated, and there is extremely little rebound loss unlike in the case of conventional gunning methods.

What is claimed is:

1. A method for wet-gunning a castable refractory composition comprising the steps of:

(a) preparing a cement-free, castable refractory composition comprising 70–98 weight % of refractory aggregate having a particle size of 10 mm or less, 2–30 weight % of ultrafine refractory powder having a particle size of 10 $\mu$m or less, and 0.01–1.0 weight %, based on 100 weight % of said refractory aggregate+said ultrafine refractory powder, of a dispersing agent;

(b) premixing said cement-free, castable refractory composition with water or other blending liquids in situ to provide an in-situ premixed, water-containing refractory material having a castable fluidity;

(c) conveying said in-situ premixed, water-containing refractory material to a gunning nozzle by a pump;

(d) adding an alkali silicate or an alkali aluminate as a shape retention agent in the form of an aqueous solution to said in-situ premixed, water-containing refractory material, in an amount of 0.1–1 weight % based on 100 weight % of said refractory aggregate+said ultrafine refractory powder, together with compressed air in said gunning nozzle; and (e) gunning the resulting mixture through said gunning nozzle.

2. The wet-gunning method according to claim 1, wherein said dispersing agent is acidic, a 1%-aqueous solution of said dispersing agent having a pH of 5 or less.

3. The wet-gunning method according to claim 2, wherein said alkali silicate has an $SiO_2/R_2O$ molar ratio of 2.0–3.3, and said alkali aluminate has an $R_2O/Al_2O_3$ molar ratio of 1–3, wherein $R_2O$ is an alkali metal oxide.

4. The wet-gunning method according to claim 1, wherein said alkali silicate has an $SiO_2/R_2O$ molar ratio of 2.0–3.3, and said alkali aluminate has an $R_2O/Al_2O_3$ molar ratio of 1–3, wherein $R_2O$ is an alkali metal oxide.

5. A method for wet-gunning a castable refractory composition comprising the steps of:

(a) preparing a cement-free, castable refractory composition comprising 70–98 weight % of refractory aggregate having a particle size of 10 mm or less, 2–30 weight % of ultrafine refractory powder having a particle size of 10 $\mu$m or less, 0.01–1.0 weight %, based on 100 weight % of said refractory aggregate+said ultrafine refractory powder, of a dispersing agent, and a thickener;

(b) premixing said cement-free, castable refractory composition with water or other blending liquids in a factory to provide a factory-premixed, water-containing refractory material having a castable fluidity;

(c) conveying said factory-premixed, water-containing refractory material to a gunning nozzle by a pump;

(d) adding an alkali silicate or an alkali aluminate as a shape retention agent in the form of an aqueous solution to said factory-premixed, water-containing refractory material, in an amount of 0.1–1 weight % based on 100 weight % of said refractory aggregate+said ultrafine refractory powder, together with compressed air in said gunning nozzle; and (e) gunning the resulting mixture through said gunning nozzle.

6. The wet-gunning method according to claim 5, wherein said thickener is an organic cellulose compound and/or an isobutylene-maleic anhydride copolymer.

7. The wet-gunning method according to claim 6, wherein said dispersing agent is acidic, a 1%-aqueous solution of said dispersing agent having a pH of 5 or less.

8. The wet-gunning method according to claim 7, wherein said alkali silicate has an $SiO_2/R_2O$ molar ratio of 2.0–3.3, and said alkali aluminate has an $R_2O/Al_2O_3$ molar ratio of 1–3, wherein $R_2O$ is an alkali metal oxide.

9. The wet-gunning method according to claim 6, wherein said alkali silicate has an $SiO_2/R_2O$ molar ratio of 2.0–3.3, and said alkali aluminate has an $R_2O/Al_2O_3$ molar ratio of 1–3, wherein $R_2O$ is an alkali metal oxide.

10. The wet-gunning method according to claim 5, wherein said dispersing agent is acidic, a 1%-aqueous solution of said dispersing agent having a pH of 5 or less.

11. The wet-gunning method according to claim 10, wherein said alkali silicate has an $SiO_2/R_2O$ molar ratio of 2.0–3.3, and said alkali aluminate has an $R_2O/Al_2O_3$ molar ratio of 1–3, wherein $R_2O$ is an alkali metal oxide.

12. The wet-gunning method according to claim 5, wherein said alkali silicate has an $SiO_2/R_2O$ molar ratio of 2.0–3.3, and said alkali aluminate has an $R_2O/Al_2O_3$ molar ratio of 1–3, wherein $R_2O$ is an alkali metal oxide.

* * * * *